Figure 1:
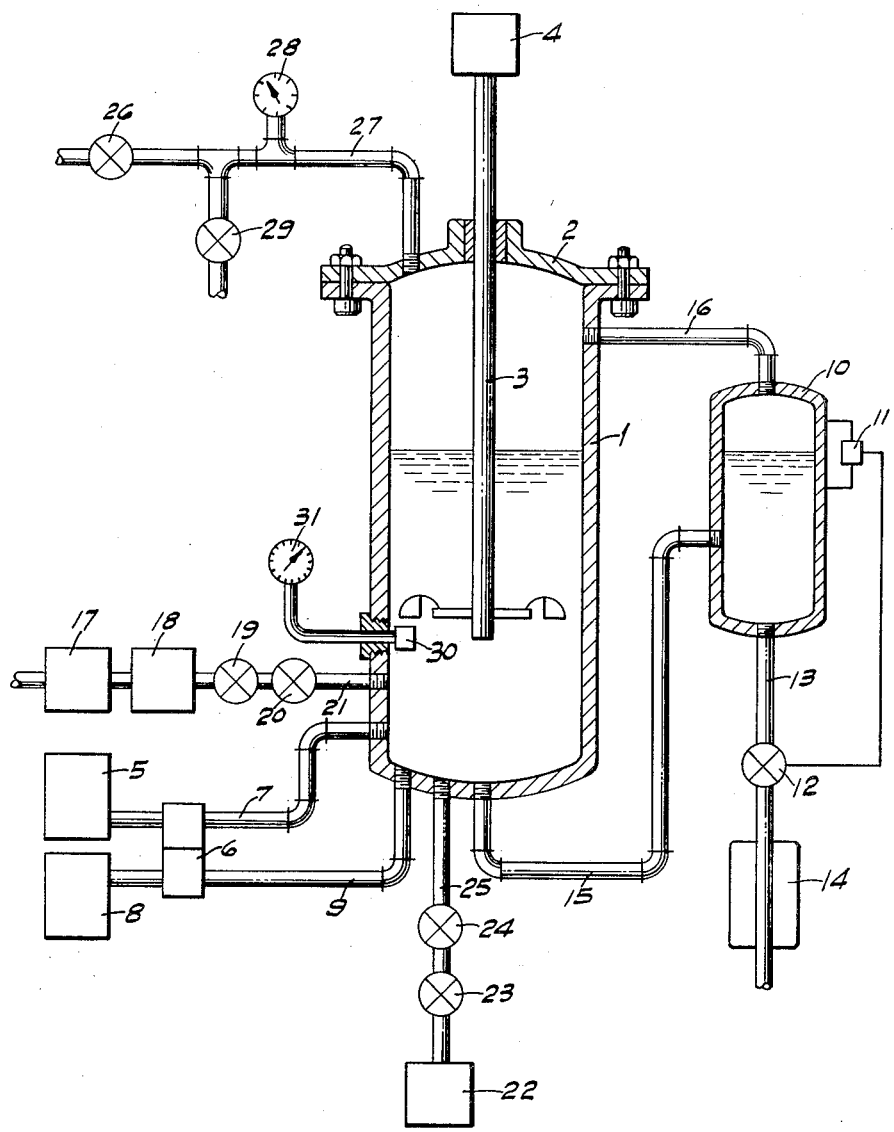

Nov. 27, 1951  J. H. FISHER ET AL  2,576,754
METHOD OF PRODUCING VANILLIN

Filed Jan. 7, 1949  3 Sheets-Sheet 1

INVENTORS
J. H. FISHER & C. A. SANKEY
BY
Harold Y. Pih
ATTORNEY

Patented Nov. 27, 1951

2,576,754

UNITED STATES PATENT OFFICE 2,576,754

METHOD OF PRODUCING VANILLIN

John Henry Fisher and Charles A. Sankey, St. Catharines, Ontario, Canada, assignors to The Ontario Paper Company Limited, Thorold, Ontario, Canada Application January 7, 1949, Serial No. 69,817
In Canada August 11, 1948

8 Claims. (Cl. 260—600)

This invention relates to the production of vanillin, acetovanillone and other oxidation products from lignosulfonic acid compounds such as waste sulphite liquor and especially from the same after treatment such that the fermentable sugar content thereof has been reduced.

It is well known that lignosulfonic acid compounds can be used to produce vanillin and other products when subjected to oxidation under suitable conditions in the presence of caustic soda or caustic potash. Cross reference is made to the co-pending applications of Marshall and Sankey, Serial Number 606,690, filed July 23, 1945, now Patent No. 2,516,827, and Serial Number 726,626, filed August 8, 1947, now Patent No. 2,544,999, and to the two applications of Fisher and Marshall filed of even date hereof, S. N. 69,815 and S. N. 69,816, in which are disclosed methods of effecting production of vanillin and co-products from lignin-containing substances in a particularly advantageous manner.

In the co-pending applications of Fisher and Marshall filed of even date thereof, S. N. 69,815 and S. N. 69,816, methods are disclosed for producing oxidation products including vanillin when lime is used as the active alkali. Disclosure is also made that the yield of vanillin can be improved by reduction of the initial concentration of lignin in the charge to the batch reaction.

We have now discovered that a further substantial increase in vanillin yield may be obtained together with other beneficial effects hereinafter mentioned, when the oxidation reaction with lime as the active alkali and in the presence of a finely dispersed gas containing free gaseous oxygen is conducted on a substantially continuous basis rather than on a batch basis and further that the increase in vanillin yield is greatly in excess of that which can be predicted according to calculations correlating batch process and continuous process yields as per accepted chemical engineering theory. We have also discovered that as applied to the instant reaction optimum yields are obtainable with a single reactor unit operating on a continuous basis which use of a single unit is also contrary to accepted chemical engineering theory.

A comprehensive discussion of the factors correlating batch process yields and continuous process yields has been published by MacMullin and Weber, Trans. Am. Inst. Chem. Eng. 31, 409–458 (1935). When applied to a process, such as the instant one, which is characterized on a batch basis by an increase in vanillin yield with reaction time up to a peak yield and by a decrease thereafter from this maximum yield, it will be apparent that the yield for a single batch reactor operating for a time corresponding to the peak yield must necessarily be greater than the expected yield for a continuous process in the same reactor under the same conditions of temperature, pressure, concentration of reactants and agitation, since small increment portions of the reaction mixture in such a continuous process will have been present in the reaction vessel for all times from theoretically zero to theoretically the full time for which the reactor has been in operation from its start-up. Such increment portions will, as discharged from the reactor, correspond to all times over the whole range of the time-yield relationship as applied to the particular reaction in the particular reaction vessel.

The theoretically expected yield from a continuous process may therefore be calculated, provided that the time versus yield relation for batch operation is known, by a consideration of the distribution of holding times in the reactor, which distribution is a probability function derived in the publication of MacMullin and Weber aforesaid.

When a continuous process of the character described is carried out in a group of reactors in series the continuous process yield is also a function of the number of such reactors. Theoretically a large number of reactors is required to approach the batch process yield and this functional relationship is also discussed in detail by MacMullin and Weber. In actual chemical engineering practice the cost of installing and using a number of reactors in series in a continuous process operation must be balanced against the increase in yield which results from the use of a large number of such reactors.

As applied to the instant reaction the use of a series of reactors for the continuous process would be justified according to accepted chemical engineering theory. Contrary to this theory we have discovered that the maximum yield of vanillin for a continuous process is obtained when one and only one reactor is used.

Figure 2:
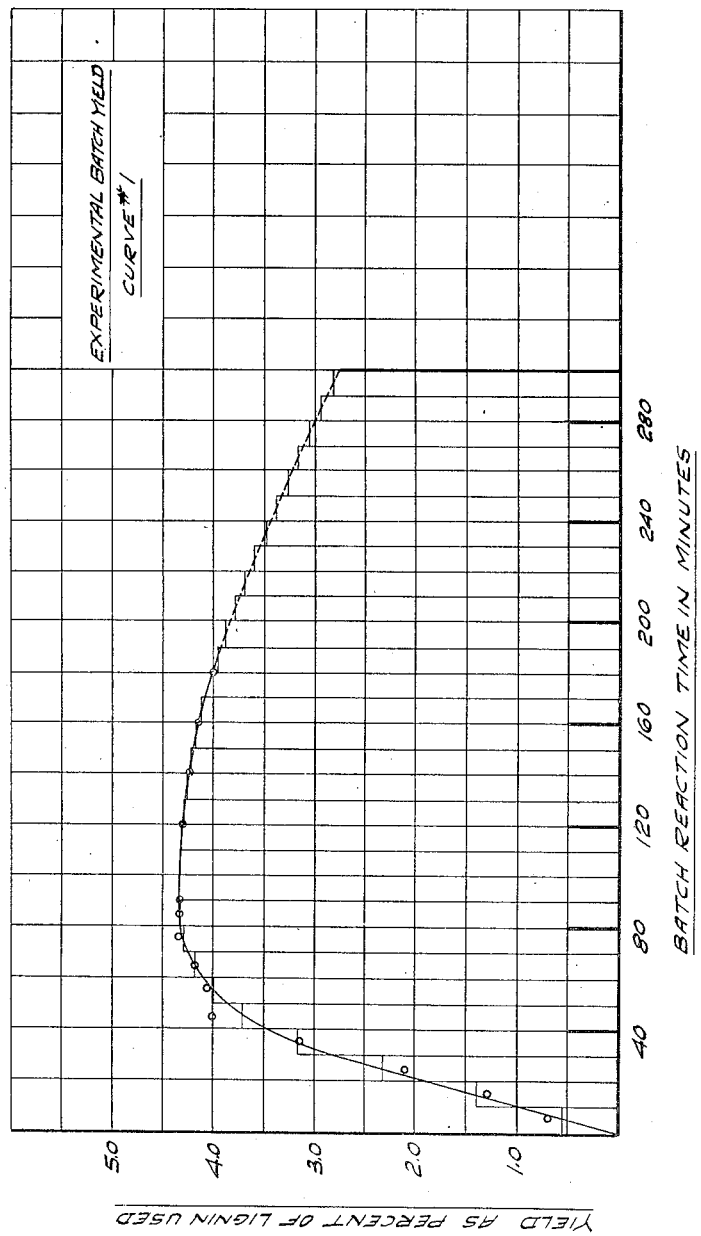

In verification of the foregoing it is instructive to apply the methods of MacMullin and Weber to instant reaction. There is shown in Fig. 2 the relationship between the yield of vanillin and the time of reaction in a batch process as experimentally determined by use by spectrometric analyses as hereinafter discussed under reaction conditions as hereinafter given for cook No. 193 of Table 2.

The expected behaviour of a reaction having a yield-time relationship in accordance with this curve when converted from a batch to a continuous process is ascertainable as follows:

The distribution of holding times in a continuous process is a function of the average holding time "T" and the number of reactors "$n$." Let $dx$ be the differential fraction of the total reactants having a reaction time in the range of $t$ to $(t+dt)$ i. e.

$$dx = f(t, T, n)$$

Let $y$ = the batch yield at time $t$ and $Y$ = the theoretical continuous process yield. The latter yield, $Y$, can be calculated by summation of all the differential products $y.dx$ through values of $t$ from zero to infinity, i. e.

$$Y = \int_{t_0}^{t_\infty} y.dx$$

Values of $y$ at any time $t$ may be read from Fig. 2. Values of $dx$ have been calculated in the form of probability curves by MacMullin and Weber.

Figure 3:
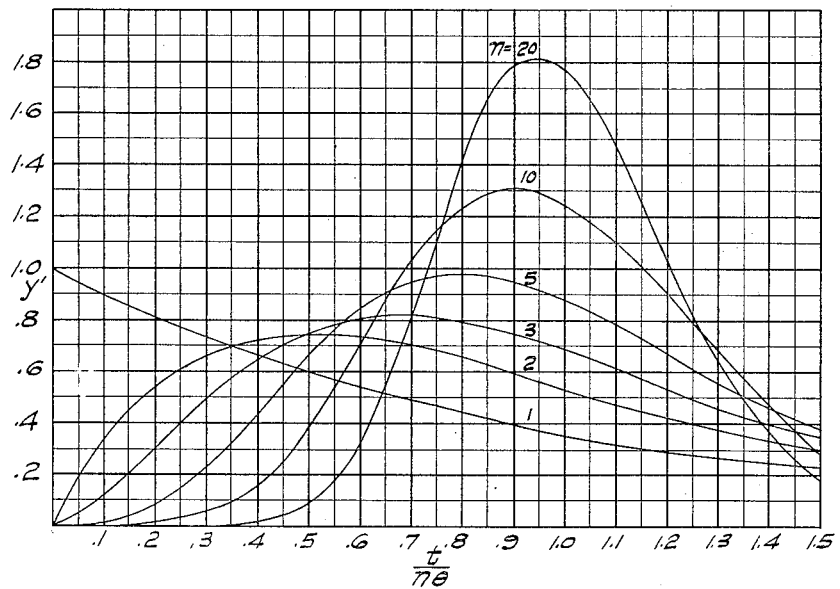

Fig. 3 is reproduced from the latter reference and supplies pertinent data for the calculations below. In this Fig. 3 the curves numbered 1, 2, 3, 5, 10, 20 refer respectively to 1, 2, 3, 5, 10 and 20 reactors in series in continuous flow. Curve 1 is applicable to the present consideration of a single reactor. These data assume conditions of perfect mixing in the continuous reaction system and therefore correspond to the ideal case of the instant application when operated on a continuous basis.

The integral $$\int_{t_0}^{t_\infty} y.dx$$

as applied to the instant case may be evaluated by assigning a small but finite value $(\Delta t)$ to $dt$. On Fig. 2 the time intervals have been stepped off in finite increments of 10 minutes. It will be apparent from an examination of the curve that the error involved in the use of a 10 minute time increment is very small.

Consider the contribution to the total continuous process yield made by that fraction of the reactants which has a holding time in the range 30 to 40 minutes in a single continuously operated reactor for which the average holding time is 100 minutes.

From Fig. 2 the batch yield corresponding to 35 minutes' reaction time is 3.1%.

From MacMullin and Weber's equation as plotted in curve 1 of Fig. 3 the value of $\Delta x$ at 35 min. is 0.070.

The product $y.\Delta x$ is therefore $$(3.1) \times (0.070) = 0.217$$

(Note.—The value 0.070 is obtained from Fig. 3 as follows:

In this figure $y'$ is plotted against $$\frac{t}{n\theta}$$

$$y' = -\frac{dy}{d\left(\frac{t}{n\theta}\right)} = -n\theta \cdot \frac{dy}{dt}$$

where
$dy$ is equivalent to $dx$ as used in the instant specification $\theta$ is the average holding time for one reactor
$n$ is the number of reactors Converting to the symbols used in this specification $$y' = -T \frac{dx}{dt}$$

since $$T = n\theta$$

hence $$-\Delta x = y' \frac{\Delta t}{T}$$

For a ratio $$\frac{t}{T} = \frac{35 \text{ min.}}{100 \text{ min.}} = 0.35$$

$y' = 0.70$ as per curve 1 of Fig. 3

Therefore $$-\Delta x = (0.70)\left(\frac{10}{100}\right) = 0.070$$

The negative sign for $\Delta x$ is because the slope of MacMullin and Weber's curve is decreasing.)

A summation by 10 minute time increments is given in Table 1. Increments are included up to a ratio $$\frac{t}{T} = 3.0$$

The appropriate values of $\Delta x$ were obtained by extending the plot of curve 1 of Fig. 3 using MacMullin and Weber's equation $$y' = e^{-\frac{t}{T}}$$

TABLE 1

| Time, min. | $y$, from Fig. 2 | $\Delta x$ | $y \cdot \Delta x$ |
|---|---|---|---|
| | Per cent | | |
| 5 | 0.6 | 0.0952 | 0.057 |
| 15 | 1.3 | 0.0860 | 0.112 |
| 25 | 2.2 | 0.0778 | 0.171 |
| 35 | 3.1 | 0.0704 | 0.217 |
| 45 | 4.0 | 0.0633 | 0.253 |
| 55 | 4.1 | 0.0578 | 0.237 |
| 65 | 4.2 | 0.0523 | 0.220 |
| 75 | 4.3 | 0.0472 | 0.203 |
| 85 | 4.4 | 0.0427 | 0.188 |
| 95 | 4.4 | 0.0385 | 0.169 |
| 105 | 4.4 | 0.0345 | 0.152 |
| 115 | 4.3 | 0.0313 | 0.135 |
| 125 | 4.3 | 0.0285 | 0.123 |
| 135 | 4.3 | 0.0257 | 0.111 |
| 145 | 4.2 | 0.0232 | 0.097 |
| 155 | 4.1 | 0.0211 | 0.087 |
| 165 | 4.1 | 0.0190 | 0.078 |
| 175 | 4.0 | 0.0176 | 0.070 |
| 185 | 3.9 | 0.0158 | 0.062 |
| 195 | 3.9 | 0.0140 | 0.055 |
| 205 | 3.8 | 0.0129 | 0.049 |
| 215 | 3.7 | 0.0113 | 0.042 |
| 225 | 3.6 | 0.0101 | 0.036 |
| 235 | 3.5 | 0.0090 | 0.032 |
| 245 | 3.4 | 0.0082 | 0.028 |
| 255 | 3.2 | 0.0078 | 0.025 |
| 265 | 3.1 | 0.0069 | 0.021 |
| 275 | 3.0 | 0.0062 | 0.019 |
| 285 | 2.9 | 0.0057 | 0.017 |
| 295 | 2.7 | 0.0051 | 0.014 |

$$\sum_{0}^{300} y.\Delta x = 3.08$$

The above calculations establish that the expected continuous process reaction yield amounts to 3.08% neglecting the effect of material having a holding time greater than 300 min. It is apparent that the product $y.\Delta x$ becomes negligibly small after 300 min. and that a yield of 3.1% is the expected continuous process yield for all practical purposes.

As the peak batch yield is 4.4%, the above calculation is a demonstration that the expected yield from a continuous reaction system for one reactor with an average holding time of 100 minutes is only 3.1÷4.4 or 70.4% of the peak batch yield.

As noted previously the yield curve data for Fig. 2 were obtained by spectrometric analyses. The absolute accuracy of the value of the yield is unimportant to the above correlation of batch and continuous process yields as long as the general shape of the curve is valid, and the analytical data are comparable.

By calculations analogous to the above, the expected continuous process yield for a single reactor is 3.15% for an average holding time of 125 minutes and 3.05% for an average holding time of 150 minutes. Such calculations may be made for any given average holding time and this will establish that for a continuous reaction system with a single reactor no average holding time may be selected for the instant reaction under the instant reaction conditions for which the continuous process yield will substantially exceed 71% of the peak batch process used.

Similar calculations may be made from systems of 2, 3 and indeed any number of reactors operated in series under conditions of continuous operation. In every case and for every holding time the expected continuous process yield is less than the peak batch yield, it being understood of course, that the expected continuous process yield approaches the peak batch yield as the number of reactors is increased.

In spite of these facts we have concluded that, owing to the dilution effect as disclosed by Fisher and Marshall in their co-pending application filed of even date hereof S. N. 69,816, for this particular reaction the use of a continuous process would produce a novel result and that the calculations as per MacMullin and Weber were inadequate. The continuous introduction of lignosulfonic acid compound into the reaction vessel containing a lower concentration of the same lignosulfonic acid compound (because a portion of such initial concentration has already been used in the course of the oxidation reaction) would have the overall effect of causing the reaction to take place at a lower concentration of lignin than in the case of a batch process. The demonstration of the correctness of these conclusions will appear in the examples hereinafter furnished.

We have also discovered, and it is a further important advantage resulting from our invention, that the settling characteristics of the sludge residual from the reaction are greatly improved, thereby permitting easier separation of the liquid and sludge portions and the more readily recovery of the valuable compounds including vanillin and acetovanillone dissolved in the liquid portion. The known greater ease of recovery of vanillin and co-products from such liquid portion has already been disclosed in the applications of Fisher and Marshall aforesaid.

The selection of preferred conditions and the necessarily functional character of this selection for the instant reaction has been disclosed in the co-pending applications of Fisher and Marshall filed of even date hereof S. N. 69,815 and S. N. 69,816. As applied to continuous process operation the disclosures of Fisher and Marshall are fully pertinent to this point. We have verified that for continuous process operation preferred conditions of temperature and partial oxygen pressure lie within the range disclosed by Fisher and Marshall, namely, temperatures in the range 120° C. to 200° C. and partial oxygen pressure less than 20 lb. per square inch, partial oxygen pressure less than 10 lb. per square inch being preferred when the temperature is in the range 175° C. to 200° C.. We have also verified the requirement of minimum active alkalinity of pH 12 or greater as disclosed by Fisher and Marshall, that is to say, the alkalinity of a sample withdrawn from the reaction zone and cooled to room temperature should not be less than 12 nor greater than that inherent in the use of lime as the active alkali. In the continuous process a reduced yield due to insufficient active alkali may be restored by the addition of more lime or sometimes by the reduction of air flow or of the reaction time, the latter two changes tending to reduce the rate of production of acidic materials. We have observed that when conditions of insufficient alkali exist the reaction discharge usually becomes much darker in colour. We have also verified that for continuous processing as well as for batch processing a reduced concentration of lignin in the range 10 to 70 grams lignin per litre in the materials entering the reactor vessel results in improvement in yield of vanillin on a lignin base, as disclosed in co-pending application of Fisher and Marshall, S. N. 69,816.

In practicing our invention we employ apparatus as illustrated in the accompanying drawings, in which Fig. 1 represents in diagrammatic form the equipment used by us for producing the oxidation products herein discussed.

Referring to Fig. 1, we employ a reaction vessel 1 equipped with a cover 2 and with provision for agitation, the type indicated being the turbo-mixer 3 driven by the motor 4. The lignosulfonic acid compound, for example alcohol plant effluent, is introduced from its storage tank 5 through the proportionating pump 6 via pipeline 7 into the reactor. The slaked lime slurry is introduced from its storage tank 8 through the proportionating pump 6 which regulates the relative volumes of the reactants and through the pipeline 9 into the reactor 1. The level in the reactor is controlled through the auxiliary level control tank 10 and the level control mechanism 11 which operates the discharge valve 12, the reactor discharge going out through the pipeline 13 controlled by the valve 12 and through the cooler 14. The pipelines 15 and 16 provide respectively the liquor phase and gaseous phase connections between the reaction vessel 1 and the level control tank 10. Air is introduced from the compressor 17 through the tank 18 and valves 19, 20 which control the pressure and rate of air flow, the air being introduced into the reactor through the pipe 21 and dispersed therein by the turbo-mixer 3.

Heat is provided by steam produced in the boiler 22 regulated as to pressure and volume by the valves 23, 24 and introduced into the reaction vessel 1 through the pipeline 25. Any other suitable heating means may, of course, also be used.

Pressure is regulated by means of the control back pressure valve 26 which limits the maximum pressure in the reaction system to a predetermined value and maintains the pressure thereat. This back pressure valve is connected to the reactor through the pipeline 27 to which are also connected a pressure gauge 28 and a general pressure relief valve 29 which may be used when required. Provision is made for temperature measurement in the reactor by the thermocouple 30 and its temperature recorder 31.

In this specification the lignin content of lignin-containing substances is measured in terms of the methoxyl content thereof and in our experiments it is assumed that the ratio of methoxyl content to lignin content of any of the mixtures investigated is 15.5 to 100. Such an assumed ratio is in accordance with current good chemical usage in dealing with lignin-containing substances. Whether this assumed ratio is or is not numerically correct is immaterial because the ratio of methoxyl to lignin may be reasonably assumed to be constant for any given lignin-containing substance. The assumption of the above ratio will, therefore, serve for purposes of obtaining a valid relative guide to the quantity of lignin in lignin-containing substances.

In analyzing materials for their vanillin content, two general techniques have been employed. The first is a gravimetric procedure involving the separation and estimation of vanillin in the form of its m-nitrobenzoyl hydrazone. This is described by Buckland, Tomlinson and Hibbert, Can. J. Research 16B, 54 (1938) and is the more accurate of the two procedures but involves a tedious analytical operation. We employ ether as a solvent in place of trichloroethylene as described in the aforementioned reference. The second is a spectrometric method of analysis according to the general method of Lemon, Ind. Eng. Chem., Anal. Ed. 19, 846 (1947). This is a rapid procedure which gives an overall measure of the substances present which are spectrometrically active at approximately 3500 $\mu\mu$, the vanillin being the principal substance present which is so active. This much more simple and rapid procedure has been used in a great deal of our work as a relative guide to the vanillin content of the various residues and has been frequently applied with the use of an appropriate empirical correction factor based on the ratio of the gravimetric to spectrometric results where both of these have been determined for the same type of residue.

The following description of experiments which have been performed by us will serve to illustrate the application and practice of our invention. It is to be understood that our invention is not limited to the materials and conditions described in these experiments which are to be considered as examples only.

was subjected to a batch type reaction under the following conditions:

Time for batch to reach 170° by direct steaming—20 min.
Time, as batch, at 170° C.—1 hr.
Air flow—32 lb. per hr.
Reactor pressure—155 lb. gauge
Partial pressure of non-condensible gases—52 lb.
Corresponding partial oxygen pressure less than 10 lb.

(Above partial pressure determined as described in the co-pending application of Fisher and Marshall of even date, S. N. 69,815.)

Continuous operation was then started with maintained temperature, pressure and air flow with feed rates:

Alcohol plant effluent—10.8 U. S. gal. per hr.
Lime slurry of 1.02 lb. slaked lime per U. S. gal. of water at a rate of 12.4 U. S. gal. slurry per hr.

Reactor volume was maintained at 39.6 U. S. gal. by the level control equipment.

Observed discharge rate from reactor—30 U. S. gal. per hr. (this is greater than the combined feed rates of reactants because direct steaming was used for heating.

Average holding time in the reactor=

$$\frac{39.6}{30} \text{ hr.} = 79 \text{ minutes}$$

Concentration of lignin to the reactor, by analysis of alcohol plant effluent and the known materials diluting this, corresponded to 18.5 grams per litre.

Continuous operations were maintained as above for 190 minutes during which time 94.8 U. S. gal. of reactor discharge were collected. A sample of the reactor discharge was then taken and showed by gravimetric analysis, a vanillin yield of 8.1% on a lignin basis.

It may be calculated by the methods of MacMullin and Weber that 10% of the original batch material should remain in the reactor at 190 minutes. The above result is therefore 90% representative of the performance under continuous operation for prolonged periods of 10% representative of the original batch material.

Similar experiments were performed for the same temperature, pressure, air flow and volume of charge but with variation in dilution of lignin and with observed average holding times. The results obtained for the group of experiments are given in Table 2.

TABLE 2

| (1) | (2) | (3) | (4) | (5) | (6) | (7) |
|---|---|---|---|---|---|---|
| Cook No. | Concentration of lignin to reactor. | Average Holding time | Vanillin Yield | Corresponding Peak Batch Yield | Continuous process theoretical yield | $\frac{\text{Col. (4)}}{\text{Col. (6)}} \times 100$ |
| | G. per l. | Minutes | Per cent | Per cent | Per cent | Per cent |
| 193 | 38 | 100 | 5.8 | 4.9 | 3.5 | 166 |
| 226 | 33 | 96 | 6.3 | | | |
| 227 | 26 | 85 | 7.3 | | | |
| 228 | 18.5 | 79 | 8.1 | 6.7 | 4.7 | 154 |

Example 1

A charge of 16.4 lb. of slaked lime, 13.9 U. S. gal. alcohol plant effluent and 16.1 U. S. gal. water was pumped into the reaction vessel which had been preheated with steam to 170° C. This In this table:

Col. (1) is an identifying code number referring to our records of experiments.
Col. (2) is determined by analysis of the alcohol plant effluent and the known dilution factors.

Col. (3) is calculated from the known volume of charge in the reactor and the observed rate of discharge.

Col. (4) is the vanillin yield on a lignin basis, all analyses by the gravimetric method, and based on samples after a continuous reaction period of 190 min.

Col. (5) is the peak batch yield, gravimetric analyses, as observed for the same alcohol plant effluent and disclosed by Fisher and Marshall in their co-pending application S. N. 69,816, filed of even date for the same lignin concentration.

Col. (6) is calculated by taking 71% of col. (5). This correlation has been previously established for the conditions of cook 193. As applied to cook 227 the application of the same ratio is a reasonable simplifying assumption because the general shape of the yield curve with time is the same for cooks of the various dilutions.

Col. (7) expresses the obtained continuous process yield as a percentage of the expected continuous process yield.

Example 2

The yield from a system of two reactors was determined for the same alcohol plant effluent using the same apparatus by operating the single reactor under conditions to give one half the average holding time (i. e. 50 min.) and then re-running the partially processed discharge a second time under the same conditions, so that the total average holding time was 100 min. The conditions of temperature, pressure, air flow and charge volume were as per Example 1. The lignin concentration corresponded to 35 grams per litre. The vanillin yield as determined by spectrometric analysis was 5.5%. By correlation with the data of Table 2 it will be apparent that the yield has not been improved by a procedure equivalent to the use of two reactors instead of one.

Example 3

The relative settling rates of the sludges produced may be estimated by measuring the ratio of the volume occupied by the sludge to the total sample volume, under comparable conditions of concentration and settling time. Using a cylindrical settling bottle, 7" high, and a settling time of 16 hours, we have observed the settled sludge volume to be normally in the range 0.28 to 0.32 for continuous processed alcohol plant effluent with a corresponding lignin concentration to reactor of 38 g. per litre. By comparison the settled sludge volume of a batch process sludge processed at the same lignin concentration to reactor was 0.55.

When in this specification we use the expression "lignosulfonic acid compounds" we mean thereby materials derived from lignin when so treated that sulfonic acids are formed therefrom, e. g. when lignin-containing substances are subjected to the sulphite pulping process, and including salts of the said sulfonic acids.

When in the claims we refer to a pH of 12 or greater, we have reference to the pH of a sample withdrawn from the reactor after being cooled to room temperature. In the determination of this pH we have used a glass electrode especially designed to be accurate in the range of high alkalinity measurements.

What we claim as our invention is:

1. A method of producing oxidation products including the calcium derivative of vanillin from lignosulfonic acid compounds in an alkaline aqueous medium containing lime as the active alkali in an amount sufficient to maintain the pH of the reaction mixture, determined on a sample withdrawn from the reaction zone and cooled to room temperature in the range not less than 12 to not more than that of a saturated solution of lime in the same mixture, which comprises introducing said compounds into a reaction zone, heating the reaction mixture to a temperature not less than 120° C., nor more than 200° C., maintaining said zone under superatmospheric pressure, continuously passing a gas containing free oxygen in finely dispersed form through said reaction zone, continuously removing residual gas, the rate of addition and removal of said gas being such as to maintain a partial pressure of oxygen in said zone of less than 20 lb. per square inch, the time of said reaction being less than four hours, the reactants being continuously introduced into, and the reaction products being continuously removed from, the agitated reaction mixture.

2. A method of producing, in a single reactor, oxidation products including the calcium derivative of vanillin from lignosulfonic acid compounds in an alkaline aqueous medium containing lime as the active alkali in an amount sufficient to maintain the pH of the reaction mixture determined on a sample withdrawn from the reaction zone and cooled to room temperature in the range not less than 12 to not more than that of a saturated solution of lime in the same mixture, which comprises introducing said compounds into a reaction zone, heating the reaction mixture to a temperature not less than 120° C., nor more than 200° C., maintaining said zone under superatmospheric pressure, continuously passing a gas containing free oxygen in finely dispersed form through said reaction zone, continuously removing residual gas, the rate of addition and removal of said gas being such as to be maintain a partial pressure of oxygen in said zone of less than 20 lb. per square inch, the time of said reaction being less than four hours, the reactants being continuously introduced into, and the reaction products being continuously removed from, the agitated reaction zone in the said reactor.

3. A method of producing oxidation products including the calcium derivative of vanillin from lignosulfonic acid compounds, the initial lignin concentration of such compounds in an alkaline aqueous medium, measured as herein prescribed, being not more than 70 grams per litre nor less than 10 grams per litre, the said medium containing lime as the active alkali in an amount sufficient to maintain the pH of the reaction mixture determined on a sample withdrawn from the reaction zone and cooled to room temperature in the range not less than 12 to not more than that of a saturated solution of lime in the same mixture, which comprises introducing said compounds into a reaction zone, heating the reaction mixture to a temperature not less than 120° C., nor more than 200° C., maintaining said zone under superatmospheric pressure, continuously passing a gas containing free oxygen in finely dispersed form through said reaction zone, continuously removing residual gas, the rate of addition and removal of said gas being such as to maintain a partial pressure of oxygen in said zone of less than 20 lb. per square inch, the time of said reaction being less than four hours, the reactants being continuously introduced into, and the reaction products being continuously removed from, the agitated reaction mixture.

4. A method of producing, in a single reactor, oxidation products including the calcium derivative of vanillin from lignosulfonic acid compounds, the initial lignin concentration of such compounds in an alkaline aqueous medium, measured as herein prescribed, being not more than 70 grams per litre nor less than 10 grams per litre, the said medium containing lime as the active alkali in an amount sufficient to maintain the pH of the reaction mixture, determined on a sample withdrawn from the reaction zone and cooled to room temperature in the range not less than 12 to not more than that of a saturated solution of lime in the same mixture, which comprises introducing said compounds into a reaction zone, heating the reaction mixture to a temperature not less than 120° C., nor more than 200° C., maintaining said zone under superatmospheric pressure, continuously passing a gas containing free oxygen in finely dispersed form through said reaction zone, continuously removing residual gas, the rate of addition and removal of said gas being such as to maintain a partial pressure of oxygen in said zone of less than 20 lb. per square inch, the time of said reaction being less than four hours, the reactants being continuously introduced into and the reaction products being continuously removed from, the agitated reaction zone in the said reactor.

5. The process of claim 1 wherein the lignosulfonic acid compound is sulphite waste liquor.

6. The process of claim 1 wherein the lignosulfonic acid compound is sulphite waste liquor which has been previously treated to reduce the fermentable sugar content thereof.

7. The process of claim 3, further characterized in that the concentration of lignin is not more than about 38 grams per liter.

8. The process of claim 4, further characterized in that the concentration of lignin is not more than about 38 grams per liter.

JOHN HENRY FISHER.
CHARLES A. SANKEY.

REFERENCES CITED

The following references are of record in the file of this patent:

UNITED STATES PATENTS

| Number | Name | Date |
|---|---|---|
| 2,099,014 | Hatch | Nov. 16, 1937 |

OTHER REFERENCES

Ser. No. 318,386, Freudenberg et al. (A. P. C.) published April 20, 1943.